Figure 1:
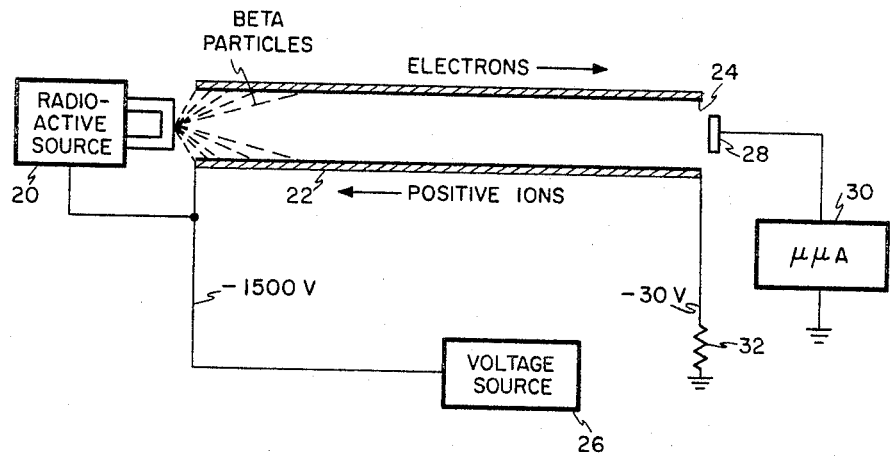

INVENTORS
GEORGE W. GOODRICH
JAMES R. IGNATOWSKI
ROBERT R. THOMPSON

BY

*Richard J. Seger*
ATTORNEY

United States Patent Office 3,271,661
Patented Sept. 6, 1966

3,271,661
IONIZATION PRESSURE GAUGE WITH SECONDARY ELECTRON EMISSIVE RESISTIVE SURFACE AND MULTIPLYING CHANNEL MEANS
George W. Goodrich, Oak Park, James R. Ignatowski, Warren, and Robert R. Thompson, Livonia, Mich., assignors to The Bendix Corporation, Southfield, Mich., a corporation of Delaware
Filed Aug. 18, 1961, Ser. No. 132,333
2 Claims. (Cl. 324—33)

This invention pertains to a pressure gauge or sensor for measuring pneumatic pressures as low as $10^{-5}$ millimeters of mercury.

It is an object of this invention to provide such a pressure gauge having a radioactive or other source emitting particles at a known rate which causes particles to impinge upon the interior surface of a channel electron multiplier such as disclosed in Patent No. 3,128,408 entitled "Electron Multiplier" issued to Goodrich et al. on April 7, 1964, or other multiplying device, to cause secondary emission from the surface and provide electrons both from the particle emitting source and the secondary emission to ionize the media, the pressure of which is to be measured. An ammeter or other detecting device is placed at the other end of the multiplier and the current detected by the ammeter will be a measure of the pressure of the media.

Figure 2:
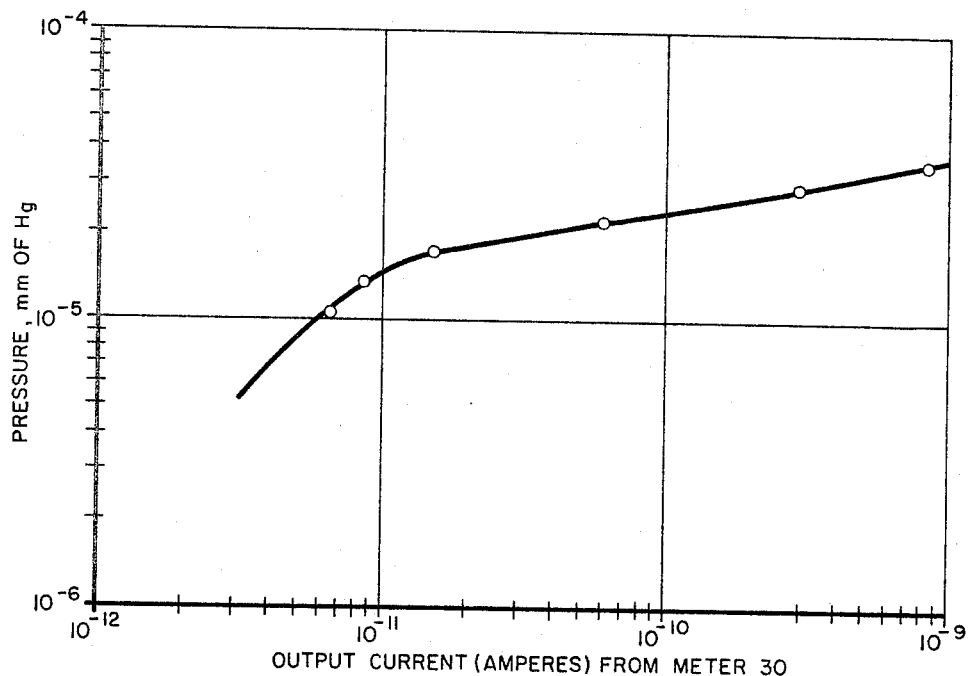

This and other objects will become more apparent when a preferred embodiment of this invention is considered in connection with the drawing in which:

FIGURE 1 is a schematic diagram of a preferred embodiment of this invention; and FIGURE 2 is a curve plotted on log paper of the pressure of the media versus the output current from the multiplier.

In FIGURE 1, is shown a preferred embodiment wherein a strontium 90 source 20 having a strength of one microcurie emits beta particles into the interior of a channel electron multiplier 22. In this embodiment, multiplier 22 is tubular in shape, is .010 inch in diameter and 0.50 inch long; and have a high resistive secondary emitting material 24 on the interior surface thereof. The resistance of surface 24 is $10^7$ ohms per square.

One end of tube or channel 22 is grounded through a resistor 32 while the other end is connected to a voltage of −1500 volts. The value of the resistor 32 is selected so that potential of the output end of the multiplier tube 22 is −30 v. A collector or anode 28 is at the output end of tube 24 and is connected to a micromicroammeter 30, which measures the output current.

Operation

The pressure gauge shown in FIGURE 1 is placed in the media or gas environment in which the pressure is to be measured so that the interior of channel 22 is subjected to the gas pressure. Source 20 emits beta particles some of which directly ionize the gas molecules inside channel 22, but most of which strike the side 24 in channel 22 causing secondary emission of electrons. These electrons then are accelerated towards anode 28 and again many electrons strike the side 24 in channel 22 causing further secondary emission of electrons. These electrons then are accelerated towards anode 28 and many electrons strike and ionize the molecules of the gas in the tube. The electrons formed during the ionization are also accelerated towards anode 28 while the ions formed are accelerated toward the end of tube 22 adjacent to the source 20. When the positive ions and electrons strike surface 24 of channel 22, further secondary emission occurs emitting electrons which add to the original electron current. In this manner, a relatively large number of electrons are produced and their number is in proportion to the number of molecules in tube 22. Of course, the number of molecules is in proportion to the pressure of the gas.

The electrons are attracted to anode 28 where they impinge upon anode 28 and flow through micromicroammeter 30 which measures the current. Due to the regenerative manner in which electrons and ions are produced, the sensitivity, or change in number of electrons with gas pressure, is very high, even for pressures as low as $10^{-5}$ millimeters of mercury. A chart showing the output current versus pressure to be measured is shown in FIGURE 2.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:

1. A pressure gauge comprising
    an emitting source for emitting radiation capable of causing secondary electron emission on a secondary electron emissive surface with said radiation being emitted at a predetermined rate,
    multiplying channel means for defining a multiplying path having an input end and an output end,
    said multiplying channel means having an inner secondary emissive resistive surface disposed to receive at the input end said radiation and emit at the output end secondary electrons generated by said radiation,
    voltage means connected to said multiplying channel means for providing a voltage differential lengthwise of said multiplying channel means resistive surface so that a positive potential gradient exists from the input end to the output end along said secondary emissive resistive surface to accelerate electrons from the input end to the output end longitudinally of said channel means,
    the channel means interior being subject to a medium the pressure of which is to be measured and said medium having molecules therein in proportion to the pressure of said medium,
    said channel means having a substantially unobstructed acceleration path so that the positive ions formed by collision between the electrons and the molecules of the medium can be accelerated to a more negative point on the secondary emissive resistive surface resulting in an impact with said inner secondary emissive surface resulting in secondary emission from said secondary emissive surface thereby providing electrons in proportion to the pressure in said medium,
    collecting means disposed at the output end of said multiplying channel means and being at a sufficiently high potential to collect the electrons from said channel means,
    indicating means connected to the collecting means for indicating the amount of the electrons collected by said collecting means which is in proportion to the pressure of the medium.

2. The pressure gauge of claim 1 wherein said emitting source comprises a radioactive source.

(References on following page)

References Cited by the Examiner

UNITED STATES PATENTS

| | | | |
|---|---|---|---|
| 2,051,693 | 8/1936 | Finch | 313—95 X |
| 2,520,603 | 8/1950 | Linder | 310—3 |
| 2,669,609 | 2/1954 | Linder | 310—3 |
| 2,993,137 | 7/1961 | Roehrig et al. | 313—7.5 |
| 3,128,408 | 4/1964 | Goodrich et al. | |

FOREIGN PATENTS 129,048    9/1959    Russia.

WALTER L. CARLSON, *Primary Examiner.*

RALPH G. NILSON, *Examiner.*

FREDERICK M. STRADER, H. S. MILLER, C. F. ROBERTS, *Assistant Examiners.*